(12) United States Patent
Tran

(10) Patent No.: US 10,558,463 B2
(45) Date of Patent: Feb. 11, 2020

(54) COMMUNICATION BETWEEN THREADS OF MULTI-THREAD PROCESSOR

(71) Applicant: Synopsys, Inc., Mountain View, CA (US)

(72) Inventor: Thang Tran, Saratoga, CA (US)

(73) Assignee: Synopsys, Inc., Mountain View, CA (US)

( * ) Notice: Subject to any disclaimer, the term of this patent is extended or adjusted under 35 U.S.C. 154(b) by 304 days.

(21) Appl. No.: 15/172,885

(22) Filed: Jun. 3, 2016

(65) Prior Publication Data

US 2017/0351518 A1 Dec. 7, 2017

(51) Int. Cl.
*G06F 9/38* (2018.01)
*G06F 9/30* (2018.01)
*G06F 9/46* (2006.01)
*G06F 9/54* (2006.01)

(52) U.S. Cl.
CPC ........ *G06F 9/3851* (2013.01); *G06F 9/30101* (2013.01); *G06F 9/30123* (2013.01); *G06F 9/30189* (2013.01); *G06F 9/461* (2013.01); *G06F 9/544* (2013.01)

(58) Field of Classification Search
CPC .. G06F 9/30123; G06F 9/3851; G06F 9/4881; G06F 2209/5018
USPC ........................................................ 712/220
See application file for complete search history.

(56) References Cited

U.S. PATENT DOCUMENTS

| | | | |
|---|---|---|---|
| 5,274,790 A | 12/1993 | Suzuki | |
| 5,333,284 A | 7/1994 | Nugent | |
| 5,463,745 A | 10/1995 | Vidwans et al. | |
| 5,471,591 A | 11/1995 | Edmondson et al. | |
| 5,519,864 A | 5/1996 | Martell et al. | |
| 5,584,038 A | 12/1996 | Papworth et al. | |
| 5,675,758 A | 10/1997 | Sowadsky et al. | |
| 5,684,971 A | 11/1997 | Martell et al. | |
| 5,761,476 A | 6/1998 | Martell | |
| 5,948,098 A | 9/1999 | Leung et al. | |

(Continued)

OTHER PUBLICATIONS

Raju Pandey, Lecture Notes—"Process and Thread Scheduling", Department of Computer Sciences, University of California, Davis, Winter 2005 (Year: 2005).*

(Continued)

*Primary Examiner* — William B Partridge
(74) *Attorney, Agent, or Firm* — Fenwick & West LLP

(57) ABSTRACT

Embodiments of the present disclosure support hardware based thread switching in a multithreading environment. The thread switching is implemented on a multithread microprocessor by utilizing thread mailbox registers and other auxiliary registers that can be pre-programmed for hardware based thread switching. A set of mailbox registers can be allocated to each thread of a plurality of threads that can be executed in the microprocessor. A mailbox register in the set of mailbox registers comprises an identifier of a next thread of the plurality of threads to which an active thread switches based on a thread switch condition further indicated in the mailbox register. The auxiliary registers in the microprocessor can be used to configure a number of threads for simultaneous execution in the microprocessor, a priority for thread switching, and to store a program counter of each thread and states of registers of each thread.

27 Claims, 7 Drawing Sheets

(56) References Cited

U.S. PATENT DOCUMENTS

| | | | |
|---|---|---|---|
| 5,987,620 A | 11/1999 | Tran | |
| 6,076,145 A | 6/2000 | Iwata et al. | |
| 6,108,769 A | 8/2000 | Chinnakonda et al. | |
| 6,112,019 A | 8/2000 | Chamdani et al. | |
| 6,205,543 B1 | 3/2001 | Tremblay et al. | |
| 6,233,599 B1* | 5/2001 | Nation | G06F 9/30127 712/207 |
| 6,247,094 B1 | 6/2001 | Kumar et al. | |
| 6,272,520 B1 | 8/2001 | Sharangpani et al. | |
| 6,341,301 B1 | 1/2002 | Hagan | |
| 6,408,325 B1 | 6/2002 | Shaylor | |
| 6,425,072 B1 | 7/2002 | Meier et al. | |
| 6,557,078 B1 | 4/2003 | Mulla et al. | |
| 6,697,939 B1 | 2/2004 | Kahle | |
| 6,785,803 B1 | 8/2004 | Merchant et al. | |
| 7,143,243 B2 | 11/2006 | Miller | |
| 7,434,032 B1 | 10/2008 | Coon et al. | |
| 7,610,473 B2 | 10/2009 | Kissell | |
| 7,644,221 B1 | 1/2010 | Chan et al. | |
| 9,348,595 B1 | 5/2016 | Mizrahi et al. | |
| 2001/0056456 A1* | 12/2001 | Cota-Robles | G06F 9/3851 718/103 |
| 2002/0083304 A1 | 6/2002 | Leenstra et al. | |
| 2003/0005263 A1* | 1/2003 | Eickemeyer | G06F 9/3802 712/218 |
| 2003/0005266 A1 | 1/2003 | Akkary et al. | |
| 2003/0033509 A1* | 2/2003 | Leibholz | G06F 9/3012 712/228 |
| 2003/0061467 A1 | 3/2003 | Yeh et al. | |
| 2004/0015684 A1 | 1/2004 | Peterson | |
| 2004/0139306 A1 | 7/2004 | Albuz et al. | |
| 2004/0172523 A1 | 9/2004 | Merchant et al. | |
| 2004/0243764 A1 | 12/2004 | Miller | |
| 2005/0044327 A1 | 2/2005 | Howard et al. | |
| 2005/0125802 A1 | 6/2005 | Wang et al. | |
| 2005/0149936 A1* | 7/2005 | Pilkington | G06F 9/3851 718/102 |
| 2005/0273580 A1 | 12/2005 | Chaudhry et al. | |
| 2006/0117316 A1* | 6/2006 | Cismas | G06F 9/3851 718/103 |
| 2007/0136562 A1 | 6/2007 | Caprioli et al. | |
| 2007/0204137 A1 | 8/2007 | Tran | |
| 2007/0266387 A1* | 11/2007 | Henmi | G06F 9/4843 718/102 |
| 2008/0082755 A1 | 4/2008 | Kornegay et al. | |
| 2008/0295105 A1* | 11/2008 | Ozer | G06F 9/3851 718/103 |
| 2009/0037698 A1 | 2/2009 | Nguyen | |
| 2010/0031268 A1 | 2/2010 | Dwyer et al. | |
| 2010/0082945 A1* | 4/2010 | Adachi | G06F 9/3851 712/200 |
| 2010/0083267 A1* | 4/2010 | Adachi | G06F 9/3851 718/103 |
| 2010/0138608 A1 | 6/2010 | Rappaport et al. | |
| 2010/0250902 A1 | 9/2010 | Abernathy et al. | |
| 2011/0067034 A1* | 3/2011 | Kawamoto | G06F 9/461 718/108 |
| 2011/0296423 A1* | 12/2011 | Elnozahy | G06F 9/54 718/102 |
| 2012/0054447 A1 | 3/2012 | Swart et al. | |
| 2012/0173818 A1 | 7/2012 | Martin | |
| 2012/0278596 A1 | 11/2012 | Tran | |
| 2012/0303936 A1 | 11/2012 | Tran et al. | |
| 2013/0290639 A1 | 10/2013 | Tran et al. | |
| 2013/0297912 A1 | 11/2013 | Tran et al. | |
| 2013/0297916 A1* | 11/2013 | Suzuki | G06F 9/38 712/221 |
| 2013/0339619 A1 | 12/2013 | Roy | |
| 2014/0047215 A1 | 2/2014 | Ogasawara | |
| 2014/0109098 A1* | 4/2014 | Sato | G06F 9/3836 718/102 |
| 2014/0189324 A1 | 7/2014 | Combs et al. | |
| 2014/0372732 A1 | 12/2014 | Fleischman et al. | |
| 2015/0220347 A1* | 8/2015 | Glossner | G06F 9/3851 712/215 |
| 2016/0004534 A1 | 1/2016 | Padmanabha et al. | |
| 2016/0246728 A1 | 8/2016 | Ron et al. | |
| 2016/0291982 A1 | 10/2016 | Mizrahi et al. | |
| 2016/0306633 A1 | 10/2016 | Mizrahi et al. | |
| 2017/0046164 A1 | 2/2017 | Madhavan et al. | |
| 2017/0168949 A1 | 6/2017 | Jackson et al. | |

OTHER PUBLICATIONS

Markovic, Nikola. "Hardware thread scheduling algorithms for single-ISA asymmetric CMPs." (2015). (Year: 2015).*

* cited by examiner

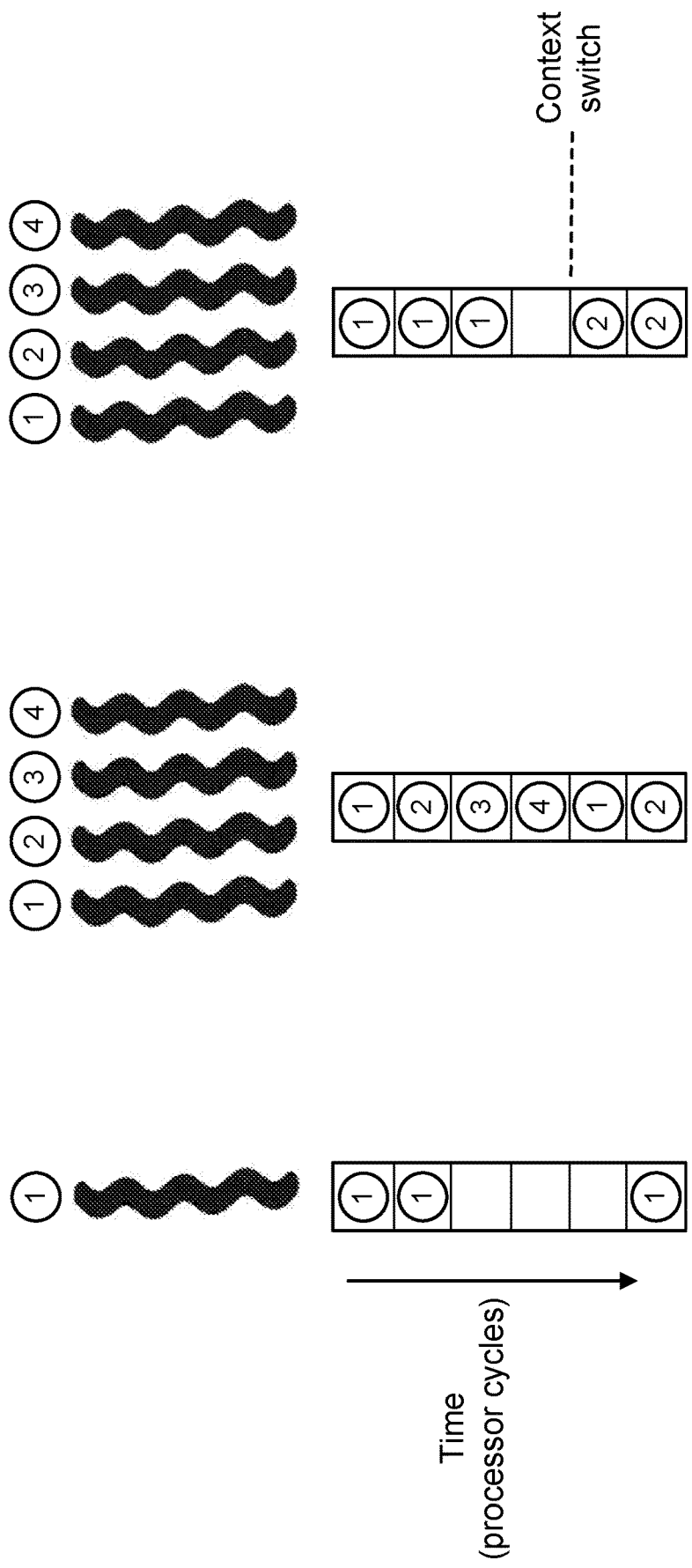

FIG. 3

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Reserved |||||||||||||||||||||||||| SMT | NUM_THREAD |||| MT |

- 300
- 302 (MT)
- 304 (NUM_THREAD)
- 306 (SMT)

FIG. 4

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Thread_disable[15:0] |||||||||||||||| Reserved |||||| Priority |||| SMT E3 | SMT E2 | SMT E1 | SMT E0 |

- 400
- 402
- 404 (Priority)
- 406 (Thread_disable[15:0])

COMMUNICATION BETWEEN THREADS OF MULTI-THREAD PROCESSOR

TECHNICAL FIELD

The present disclosure generally relates to processing devices, and more particularly relates to multiple program executions within a processing device.

BACKGROUND

The market for portable devices, for example, mobile phones, smart watches, tablets, etc., is expanding with many more features and applications. As the number of applications on these devices increases, there also is an increasing demand to run multiple applications concurrently. More features and applications call for microprocessors to have high performance, but with low power consumption. Multithreading can contribute to high performance in this new realm of application. Keeping the power consumption for the microprocessor and related cores and integrated circuit chips near a minimum, given a set of performance requirements, is desirable, especially in portable device products.

Multithreading is the ability to pursue two or more threads of control in parallel within a microprocessor pipeline. Multithreading is motivated by low utilization of the hardware resource in a microprocessor. In comparison, multicore is fairly wasteful of the hardware resource. Multithreading can, in general, provide the same performance as multicore without duplicating of resources.

Multithreading can be used in an effort to increase the utilization of microprocessor hardware and improve system performance. Multithreading is a process by which two or more independent programs, each called a "thread," interleave execution in the same processor, which is not a simple problem. Each program or thread has its own register file, and context switching to another program or thread requires saving and restoring of data from a register file to a memory. This process can consume much time and power. These and other problems confront attempts in the art to provide efficient multithreading processors and methods.

SUMMARY

In some embodiments of the present disclosure, certain auxiliary registers of a microprocessor are pre-programmed such that thread switching is performed in hardware without any software intervention or external intervention.

Example embodiments of the present disclosure include configurations that may include structures and processes within a microprocessor. For example, a configuration may include allocating a set of mailbox registers to each thread of a plurality of threads for execution in the microprocessor, including, in a field of a mailbox register in the set of mailbox registers, an identifier of a next thread of the plurality of threads to be executed in the microprocessor upon thread switching, and switching execution of the thread to execution of the next thread based upon a thread switch condition indicated in the mailbox register and the identifier of the next thread.

Example embodiments of the present disclosure include configurations that may include structures and processes within a microprocessor. For example, a configuration may include a set of mailbox registers allocated to each thread of a plurality of threads for execution at the microprocessor, and one or more auxiliary registers allocated to one or more of the plurality of threads. A mailbox register in the set of mailbox registers allocated to each thread comprises an identifier of a next thread of the plurality of threads to which that thread switches based on satisfying a thread switch condition indicated in the mailbox register. The one or more auxiliary registers configure at least one of: a number of threads in the plurality of threads for execution at the microprocessor, a priority for thread switching, storing a program counter (PC) of each thread, or storing states of registers of each thread.

BRIEF DESCRIPTION OF THE DRAWINGS

FIGS. 1A-1E illustrate different types of multithreading, in accordance with example embodiments of the present disclosure.

FIG. 3 is an example thread configuration register, in accordance with example embodiments of the present disclosure.

FIG. 4 is an example thread enable register, in accordance with example embodiments of the present disclosure.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the present disclosure relate to different types of multithreading that can be employed at a microprocessor. The coarse-grain multithreading refers to a multithreading when a thread switches on Level-2 (L2) or Level-3 (L3) cache misses, i.e., on very long latency instruction(s). The fine-grain multithreading refers to a multithreading approach when there is a dedicated cycle for each thread, which may reduce or eliminate load-to-use latency penalty for load instructions. The simultaneous multithreading (SMT) refers to a multithreading approach when each thread can be in any pipeline stage at any time, which may be suitable to an out-of-order superscalar microprocessor.

FIG. 1A illustrates an example single program (thread) run on a single processor. In this particular case, no multithreading is applied in a microprocessor. FIG. 1B illustrates an example fine grain multithread, where there is a fixed time slot for each thread. In this case, the fixed time slot is dedicated to a specific thread and cannot be used by another thread. FIG. 1C illustrates an example coarse grain multithreading, which employs a context switch when switching from one thread to another. Unlike the fine grain multithreading shown in FIG. 1B, in the case of coarse grain multithreading there is only one thread running in a microprocessor at a time.

Figure 1E:
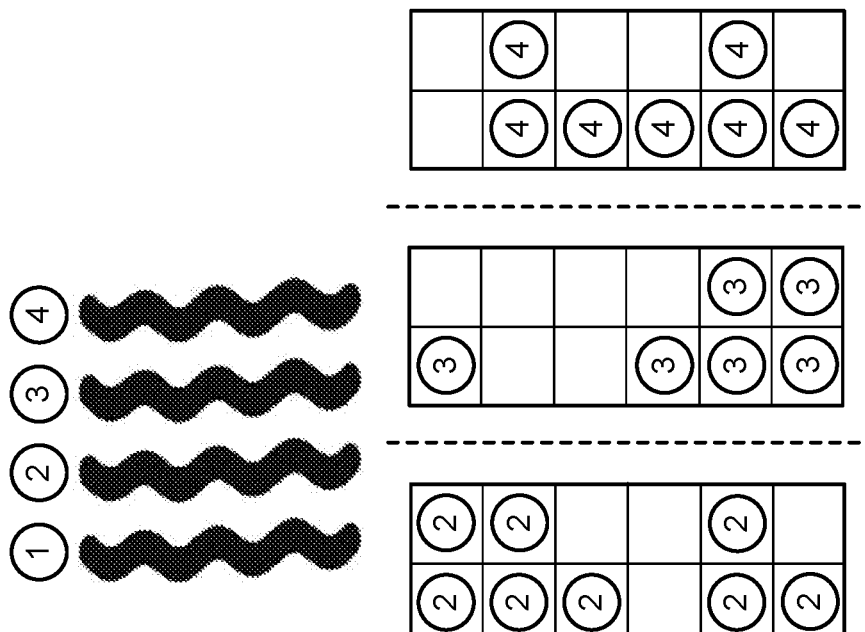
Figure 1D:
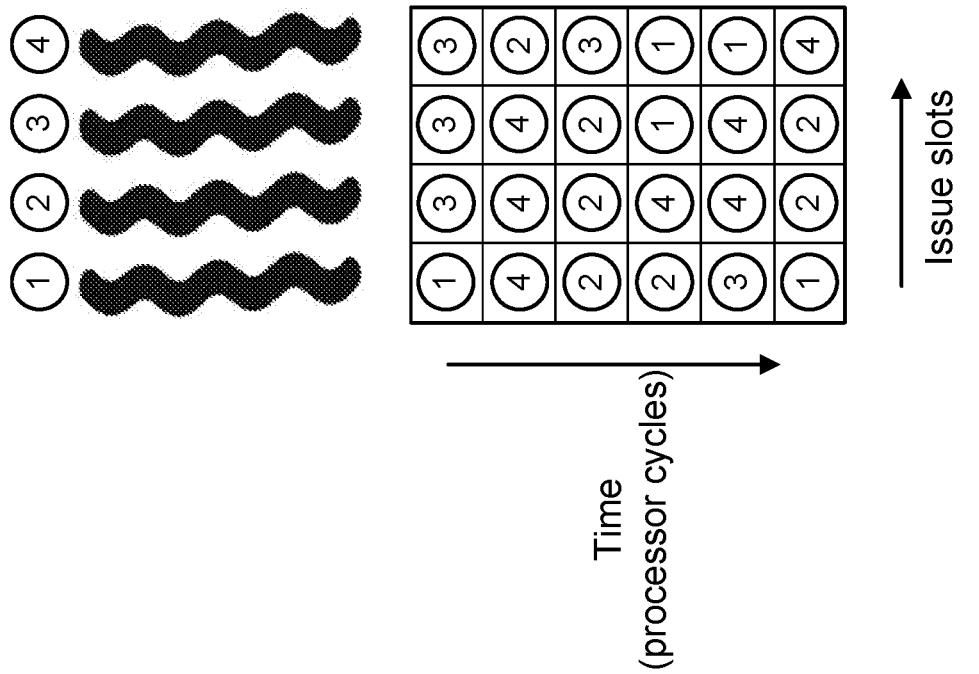

FIG. 1D illustrates an example simultaneous multithreading (SMT), in accordance with an embodiment. As illustrated in FIG. 1D, an available thread (e.g., one of four threads running on a processor) can be issued in a pipeline whenever there is an opportunity. By employing the SMT, much better utilization of a microprocessor can be achieved. FIG. 1E illustrates an example multi-core processor implementation. In this case, each thread (e.g., one of four threads running on the multi-core processor) can be run in a different core of the multi-core processor.

Coarse grain multithreading has been used frequently as an approach for context switch program execution. The context switch represents a software control in which the register file is saved into a memory and restored when returning to the original program. Coarse grain multithreading represents the same approach as the context switch except that hardware of a microprocessor is responsible to save and restore the register file. Coarse grain multithreading is particularly useful when an operation takes hundreds of cycles to complete (e.g., very long latency operation). In this case, the processor can be better utilized by executing other programs (threads). Hardware-based thread switching can be used in case of a single thread execution as well as for fine grain multithreading or SMT. The stalled thread can be switched with another active thread. The time needed for storing (or saving) and restoring of the register file to the memory reduces the effectiveness of the second thread execution, especially when the register file is large (e.g., contains 32 entries or more).

Various microprocessors have been designed in an attempt to increase on-chip parallelism through superscalar techniques, which are directed to increasing instruction level parallelism (ILP), as well as through multithreading techniques, which are directed to exploiting thread level parallelism (TLP). A superscalar architecture attempts to simultaneously execute more than one instruction by fetching multiple instructions and simultaneously dispatching them to multiple (sometimes identical) functional units of the processor. A typical multithreading operating system (OS) allows multiple processes and threads of the processes to utilize a processor one at a time, usually providing exclusive ownership of the microprocessor to a particular thread for a time slice. In many cases, a process executing on a microprocessor may stall for a number of cycles while waiting for some external resource (for example, a load from a random access memory (RAM)), thus lowering efficiency of the processor. In accordance with embodiments of the present disclosure, SMT allows multiple threads to execute different instructions from different processes at the same microprocessor, using functional units that another executing thread or threads left unused.

For certain embodiments of the present disclosure, multithreading can be controlled through auxiliary (AUX) registers. AUX registers also may be referred to as special purpose registers that are accessible by instructions. Disclosed embodiments of the present disclosure include methods for pre-programming of threads and for switching threads on hardware conditions. In one or more embodiments, a thread can switch to another thread based on a software instruction, an interrupt, and/or by configuring AUX registers to switch execution of the thread to the other thread. In some embodiments, the performance monitor can be expanded to include a thread identifier (ID) for each thread switching event.

Figure 2:
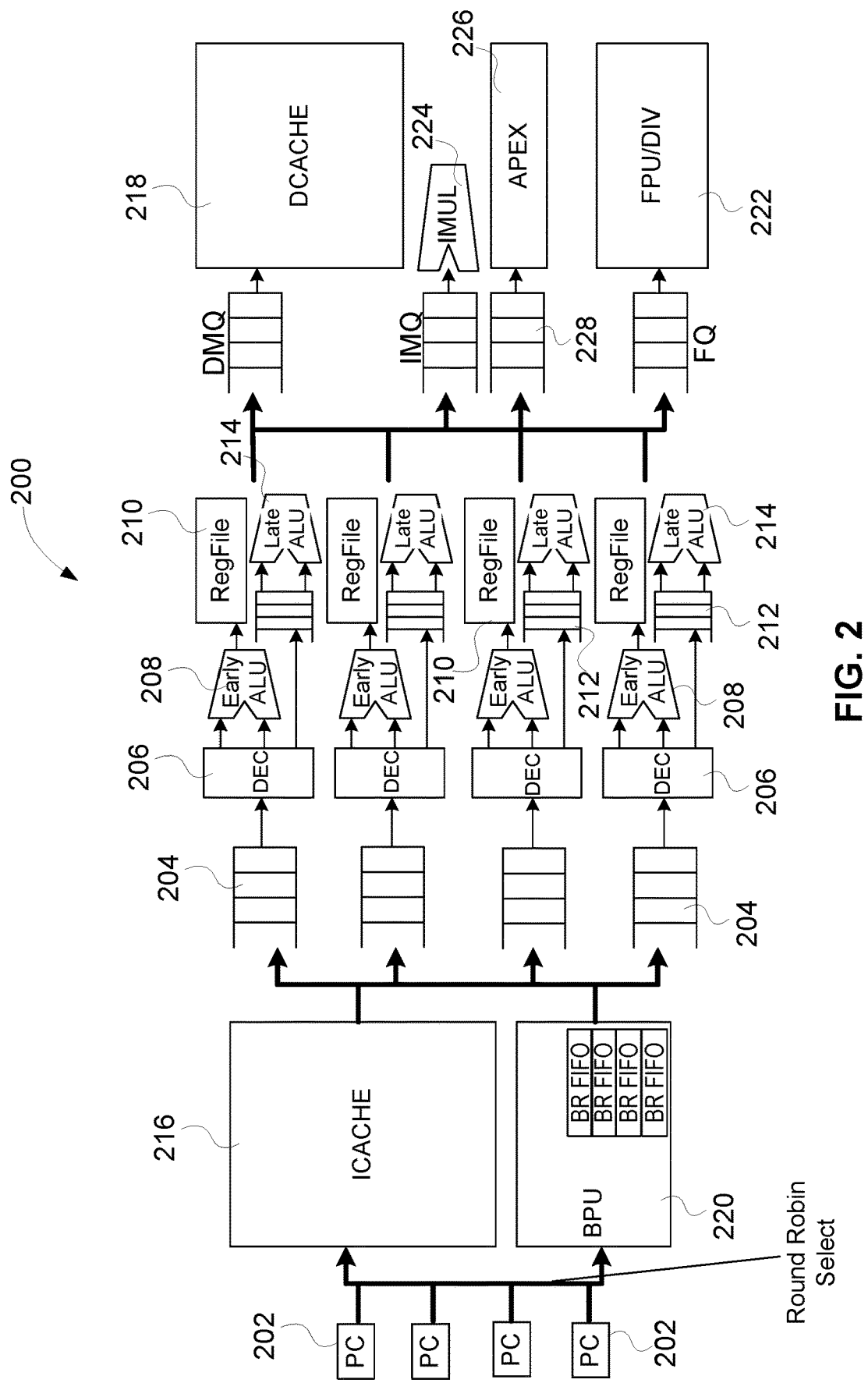
FIG. 2 is an architecture block diagram of a single core microprocessor that supports thread switching without full save and restore of a register file, in accordance with example embodiments of the present disclosure.

FIG. 2 illustrates an architecture block diagram of a microprocessor 200 with high performance SMT implementation, in accordance with embodiments of the present disclosure. As illustrated in FIG. 2, the microprocessor 200 may comprise multiple resources dedicated to different threads when these resources are necessary or inexpensive, such as program counters (PCs) 202 (e.g., selected in a round robin manner), multiple instruction queues (IQs) 204, multiple decode units 206, Early Arithmetic Logic Units (ALUs) 208, register files 210, Late ALU Queues (LAQs) 212 and Late ALUs 214. On the other hand, as illustrated in FIG. 2, certain resources of the microprocessor 200 are not replicated. In one or more embodiments, expensive resources (e.g., in terms of area size and/or power consumption), such as an instruction cache 216, a data cache 218, branch prediction unit (BPU) 220 and floating point unit (FPU) 222 are not replicated, i.e., they are shared among multiple threads. Furthermore, those infrequently used resources, such as a divide unit (DIV) 222 and an Integer Multiplier (IMUL) unit 224 are also not replicated. In some embodiments, Arc Processor Extension (APEX) unit 226 can be implemented as a customer specific functional unit. In one or more embodiments, APEX unit 226 can comprise independent functional sub-units allocated to the multiple threads. In one or more other embodiments, APEX unit 226 can be defined as a functional unit shared among the multiple threads. In either configuration of APEX unit, an Arc Processor-extension Queue (APQ) interfaced with APEX unit can be defined as a shared resource and implemented as shared APQ 228 illustrated in FIG. 2, or APQ can be implemented as independent APQs (not shown in FIG. 2).

Described embodiments include a method and apparatus for efficient control of multithreading on a single core microprocessor, such as the microprocessor 200 illustrated in FIG. 2. The disclosed configuration can achieve substantially same performance when employing multithreading on a single core microprocessor as when a multicore microprocessor is utilized. In accordance with embodiments of the present disclosure, the multicore microprocessor may be replaced with a single core microprocessor, and programs (threads) that run on the multicore microprocessor should run in the same manner on a multithreading single core microprocessor.

Embodiments of the present disclosure support multithreading on a single core microprocessor for different applications, for example, SMT and coarse grain multithreading, supporting any multicore customer with any multi-context application, and employing a total of 16 threads on quad-thread SMT. A single core microprocessor (e.g., the microprocessor 200 illustrated in FIG. 2) with efficient multithreading implementation presented in this disclosure has competitive advantage over a single core microprocessor which does not support multithreading. The single core microprocessor with efficient multithreading implementation presented herein may have approximately twice better performance in comparison to conventional multithreading microprocessor.

For some embodiments of the present disclosure, out-of-order implementation can be adapted to multithreading and implemented at the microprocessor 200. In this way, the microprocessor 200 occupies smaller area and achieves more efficient power consumption without sacrificing running performance. As discussed above, because of out-of-order instruction execution at the microprocessor 200, the functional units with small area may be replicated, such as decode units 206, Early ALUs 208, LAQs 212 and Late ALUs 214. On the other hand, the functional units of the microprocessor 200 with large and expensive resources that may utilize an idle time of the resource effectively, such as instruction cache 216, data cache 218, BPU 220 and FPU 222 can be shared among multiple threads. In addition, infrequently used functional resources that may execute out-of-order instructions, such as DIV 222, IMUL 224, APEX 226, may be also shared among multiple threads executed at the microprocessor 200. In an illustrative embodiment, an example of utilization of the large resource can be the instruction cache 216; the decode unit 206 can consume one instruction per clock cycle and the instruction cache 216 shared among four threads can fetch four instructions per clock cycle. If the decode unit 206 can consume two instructions per clock cycle, then the instruction cache 216 can fetch eight instructions per clock cycle.

A microprocessor architecture presented in this disclosure such as the microprocessor 200 includes a very flexible and robust AUX register set (not shown in FIG. 2). In accordance with embodiments of the present disclosure, AUX registers can be added to the architecture of the microprocessor 200 for multithread communication. A typical multithread microprocessor for networking application can have four simultaneous threads (SMTs) and 16 coarse gain threads. Thus, if one thread is idle, then another thread can replace the idle thread. The decision to switch a thread is commonly implemented by polling, detection and/or interrupts. Embodiments of the present disclosure utilize a thread mailbox AUX register for hardware-based thread switching. Once the thread mailbox is programmed, the thread switch can be performed in hardware without any software intervention, which is more efficient. The mechanism for thread switching based on the mailbox presented in this disclosure includes several AUX registers that are described in more detail below.

FIG. 3 illustrates an example thread configuration register 300, in accordance with embodiments of the present disclosure. The thread configuration register 300 may be included into the microprocessor 200 shown in FIG. 2. The thread configuration register 300 represents an AUX register that comprises a basic configure number of SMT threads and a total number of threads supported at a microprocessor. The configuration register 300 may be configured as a read-only register, and the number of threads may be configured at a build time.

As illustrated in FIG. 3, the thread configuration register 300 may comprise several fields. A field 302 may comprise a multi-thread (MT) bit for configuration of multithreading. If the MT bit is 0, multithreading is not configured, and a single thread is running on a single core of a microprocessor. If the MT bit is set to 1, multithreading is configured and multiple threads may run on a single core of the microprocessor. A field 304 may comprise NUM_THREAD[4:1] bits, which indicate a total number of threads that can be configured for execution in the microprocessor core.

A field 306 of the thread configuration register 300 may comprise SMT[6:5] bits, which indicate a number of simultaneous threads in the core only with the MT bit set to 1. In some embodiments, a scratch memory (not shown) can be implemented in the microprocessor 200 to save and restore the register file 210 for thread switching. In this case, the save and restore mechanism for thread switching can be performed in hardware without assistance of software programming. SMT[6:5]=00 indicates support for a single thread, wherein one register file (e.g., the register file 210 of the microprocessor 200 shown in FIG. 2) is implemented for thread switching; SMT[6:5]=01 indicates support for a dual-thread, wherein two register files are implemented for thread switching; SMT[6:5]=10 indicates support for a triple-thread, wherein three register files are implemented for thread switching; SMT[6:5]=11 indicates support for a quad-thread, wherein four register files are implemented for thread switching.

FIG. 4 illustrates an example thread enable register 400, in accordance with embodiments of the present disclosure. The thread enable register 400 may be included into the microprocessor 200 shown in FIG. 2. The thread enable register 400 can be used to enable threads and set up priority for thread switching. A field 402 of the thread enable register 400 may comprise SMT Enable bits[3:0] for enabling each individual thread (e.g., thread 0, 1, 2 and 3) in the SMT mode, and represent status bits for SMT. SMT Enable bits[3:0] may have a default value of '0001' indicating that thread 0 is enabled at a boot time, and thread 0 needs to enable other threads in the SMT mode.

A field 404 of the thread enable register 400 shown in FIG. 4 may comprise Thread Priority[6:4] bits. If Thread Priority[6:4]=000, thread switching may be implemented in the round-robin manner where a First-In First-Out (FIFO) register is employed. In one or more embodiments, a released thread may enter at the bottom of the FIFO register. Any thread being disabled (e.g., any of 16 coarse grain threads) as indicated in a field 406 (Thread-disable[31:16] bits) will be skipped. If Thread Priority[6:4]=001, for some embodiments, four mailboxes may be used for thread switching, as discussed in more detail below. In an embodiment, a program can be responsible to load each mailbox with a next thread (e.g., at a boot time). It should be noted that more than one thread can be pushed into a mailbox (e.g., the mailbox being implemented as a FIFO register). In one or more embodiments, values of '010'-'111' for Thread Priority[6:4] bits can be reserved.

The field 406 of the thread enable register 400 illustrated in FIG. 4 may comprise Thread Disable[15:0] bits, wherein one bit of the Thread Disable[15:0] bits can be allocated per thread (e.g., a coarse grain thread). Thread Disable[15:0] bits are mask bits. If a bit of the Thread Disable[15:0] bits is 0, then a corresponding thread is enabled to be activated (e.g., default value). If a bit of the Thread Disable[15:0] bits is set to 1, than a corresponding thread is disabled, and the thread cannot be activated.

Figure 5:
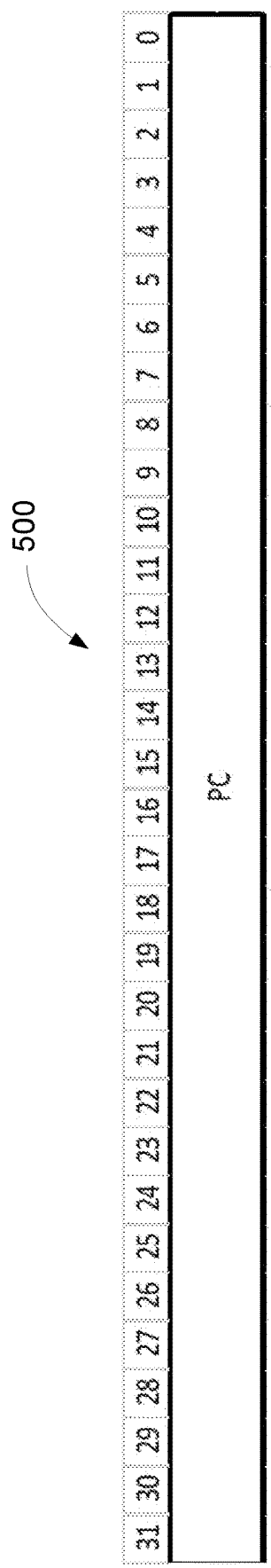
FIG. 5 is an example thread program counter (PC) register, in accordance with example embodiments of the present disclosure.

FIG. 5 illustrates an example thread program counter (PC) register 500 for each thread to be executed at a microprocessor, in accordance with embodiments of the present disclosure. The thread PC register 500 allocated for each thread may be included into the microprocessor 200 shown in FIG. 2. For some embodiments, the thread PC register 500 can be read/written based on an AUX address of the thread PC register 500. For example, the default address of the thread PC register 500 can be 0. The thread PC register 500 can be initialized for each thread. When a thread is disabled, a current PC (e.g., PC 202 of the microprocessor 200 shown in FIG. 2) can be written into a thread PC register 500 associated with the disabled thread. When a thread is enabled, a thread PC register 500 associated with the enabled thread can be used to fetch an instruction of the enabled thread. A width of PC 202 and consequently a width of the PC register 500 are dependent on memory address bits implemented by the microprocessor 200.

For some embodiments, the thread PC register 500 can be modified using an AUX interface of the microprocessor. In an embodiment, architecture PC per thread can be implemented in a commit stage. A commit queue may be configured to update a specific thread PC register 500 using a thread ID. In one or more embodiments, the architecture PCs associated with all supported threads can be also accessible from the AUX interface.

Figure 6:
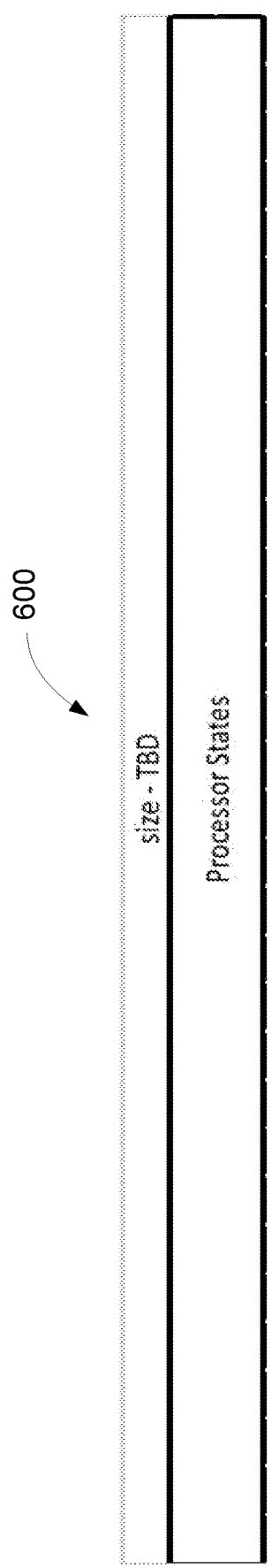
FIG. 6 is an example register comprising thread processor states, in accordance with example embodiments of the present disclosure.

FIG. 6 illustrates an example register 600 comprising thread processor states for each thread to be executed at a microprocessor, in accordance with embodiments of the present disclosure. The thread processor states register 600 allocated for each thread may be included into the microprocessor 200 shown in FIG. 2. In one or more embodiments, the thread processor states register 600 can be read and/or written based on an AUX address of the thread processor states register 600. The thread processor states register 600 can be initialized for each thread with corresponding processor states. In an embodiment, the default data in a thread processor states register 600 are all zeroes.

For some embodiments, when a thread is inactive, the current processor states are written into a thread-processor-state register 600 that is associated with the inactive thread. When a thread is active, a thread-processor-state register 600 associated with the active thread can be restored to current processor states. In one or more embodiments, a thread processor states register 600 can be modified using an AUX interface of a microprocessor.

For some embodiments, the processor states stored in a thread-processor-state register 600 shown in FIG. 6 may comprise: fault bits, error bits, condition for thread switching bits, mode bits, option (configuration) bits, and so on. In an embodiment, an architecture processor state per thread can be implemented in a commit stage. A commit queue may update a specific processor state using the thread ID. In one or more embodiments, the architecture processor states associated with the supported threads can be also accessible by an AUX interface of a microprocessor.

Figure 7:
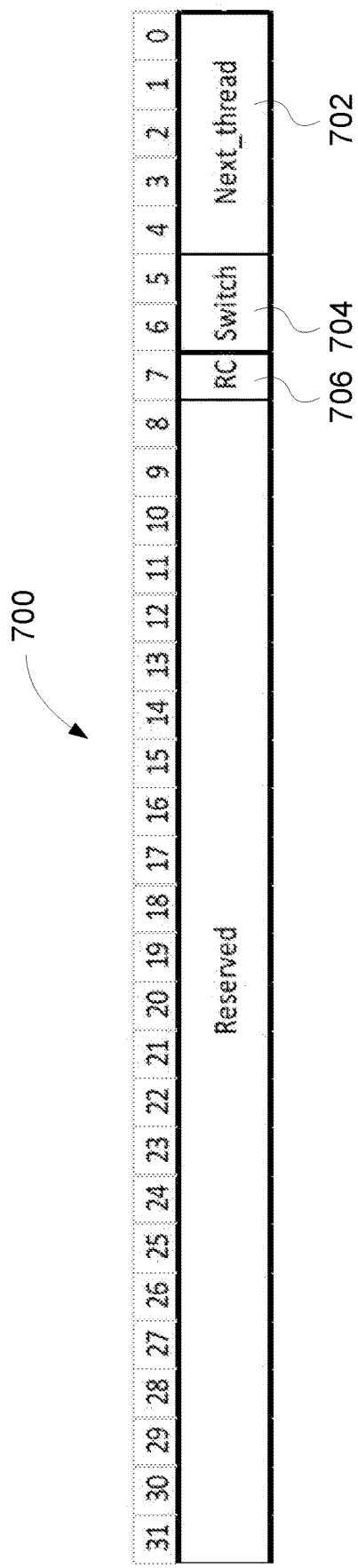
FIG. 7 is an example thread mailbox register allocated to each thread of a plurality of threads for execution in a microprocessor, in accordance with example embodiments of the present disclosure.

FIG. 7 illustrates an example thread mailbox register 700, in accordance with embodiments of the present disclosure. Each thread of a plurality of threads for execution in a microprocessor may be associated with a mailbox register 700 specifically allocated to that thread. In some embodiments, the mailbox registers 700 allocated for the plurality of threads may be included into the microprocessor 200 shown in FIG. 2. Each individual mailbox register 700 may be implemented as a mailbox entry into a thread mailbox FIFO register or a rotating queue, as discussed in more detail below in relation to FIG. 8. In one or more embodiments, a specific program (e.g., that may be run at a build time) can be responsible for configuring a mailbox register 700 such that a thread associated with the mailbox register 700 switches to a next thread indicated in the mailbox register 700 when a thread switch condition also specified in the mailbox register 700 is satisfied. In some embodiments, a field 702 of the mailbox register 700 may comprise an identifier of the next thread to be executed in the microprocessor upon thread switching. In an embodiment, a program may set an appropriate value of the field 702, i.e., the program may provide the identifier of the next thread in the field 702 of the mailbox register 702. In an illustrative embodiment, up to four threads can be pushed into the thread mailbox FIFO register comprising entries with the structure of mailbox register 700, as discussed in more detail below in relation to FIG. 8. A default value for a number of threads pushed into the thread mailbox FIFO register can correspond to a number of available threads in a microprocessor configuration.

When a programmed event for thread switching is a trigger, the thread mailbox FIFO register may cause an interrupt to processor execution of the current thread, leading to thread switching. The current thread being switched can be recycled by pushing an entry of the thread comprising the mailbox register 700 back into the thread mailbox FIFO register, as discussed in more detail below in relation to FIG. 8. In one or more embodiments, a programmed event for thread switching can originate from an internal instruction such as a software interrupt (SWI) or from an external event such as L2 cache miss. In an embodiment, the mailbox register 700 or an entry into the thread mailbox FIFO register can be accessed from an external source such as a system-on-chip (SOC) level AUX module, which may be used for L2 cache and peripherals.

Embodiments of the present disclosure support three models for thread switching. In one embodiment, a switched thread may send (or transmit) an interrupt signal to a control processor to configure an identifier of a next thread in the mailbox register 700. For example, the control processor may provide, in response to the received interrupt signal, the identifier of the next thread in the field 702 of the mailbox register 700. The control processor can write to the thread mailbox FIFO register and other AUX registers from an external source. In another embodiment, as discussed, a mailbox register 700 of the current thread can be pushed back (or recycled) into the thread mailbox FIFO register. In yet another embodiment, the thread mailbox FIFO register can be configured to trigger writing the current thread that is being switched into an external memory dedicated for thread switching. The mailbox register 700 of the current thread that is being switched can be further utilized to obtain identification of the next thread from the field 702, and the next thread can be loaded from the external memory for future execution based on the identification of the next thread.

Specifically, the field 702 of the mailbox register 700 shown in FIG. 7 may comprise Next thread[4:0] bits, which indicate a next thread for execution at a microprocessor when a thread switch condition is met. A field 704 of the mailbox register 700 may comprise Switch condition[6:5] bits that define the thread switch condition. The value of '00' of the Switch condition[6:5] bits may indicate thread switch on L2 cache miss; the value of '01' of the Switch condition [6:5] bits may indicate thread switch based on a timer; the value of '10' of the Switch condition[6:5] bits may indicate thread switch on SWI of a current thread; and the value of '11' of the Switch condition[6:5] bits may be reserved (e.g., a thread can be switched on an interrupt or an event). A field 706 of the mailbox register 700 may comprise a Recycle Enable[7] bit. If the Recycle Enable bit is 0, no action is needed. As a thread is selected for removal, an entry corresponding to this thread is removed from the thread mailbox FIFO register. If the Recycle Enable bit is set to 1, then a thread needs to be recycled. As the thread is selected for recycling, an entry corresponding to this thread is pushed back (or recycled) into the thread mailbox FIFO register.

Figure 8:
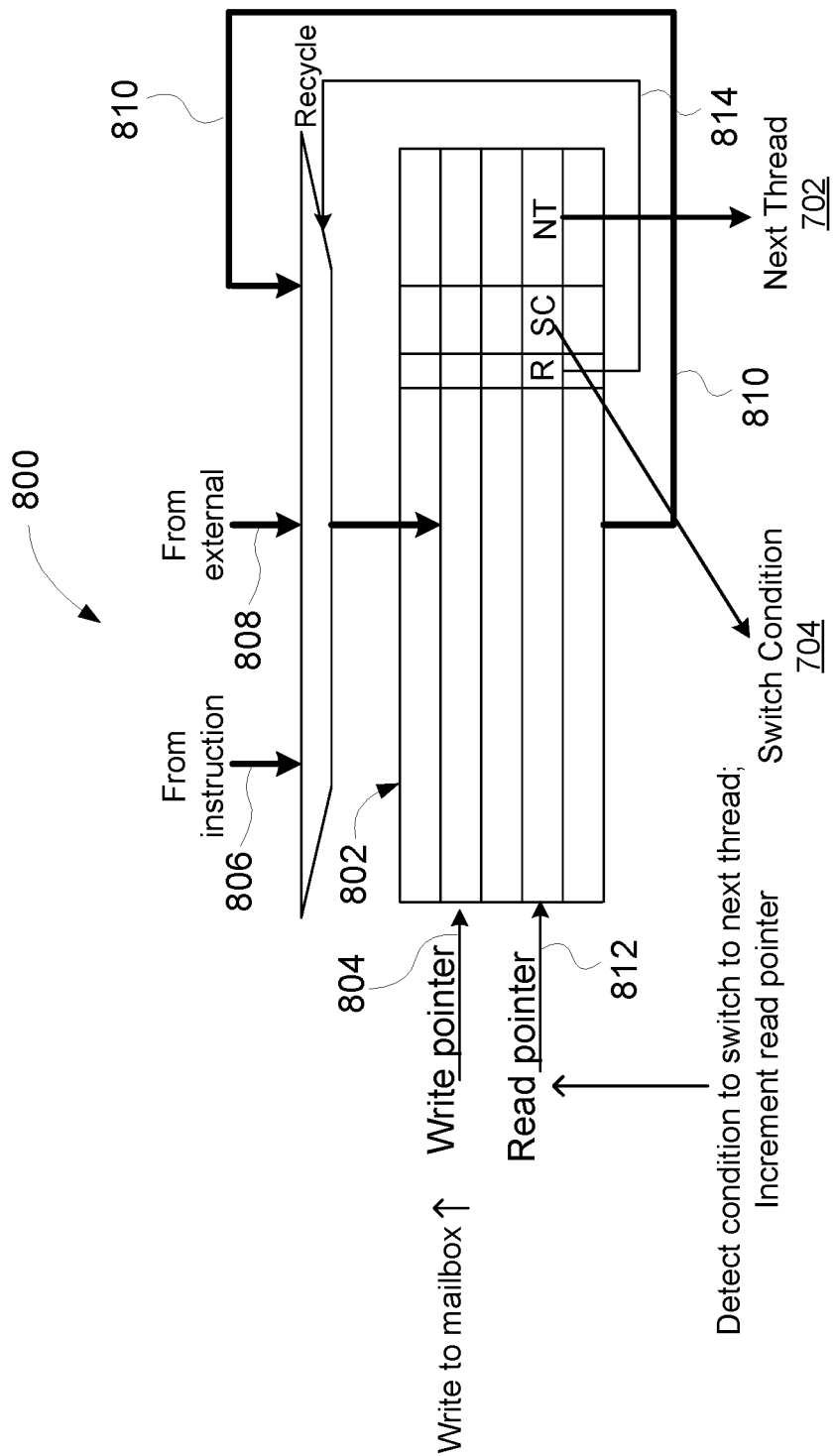
FIG. 8 is an example thread mailbox First-In First-Out (FIFO) implementation incorporating a plurality of thread mailbox registers shown in FIG. 7, in accordance with example embodiments of the present disclosure.

FIG. 8 illustrates an example thread mailbox FIFO register implementation 800 incorporating a plurality of thread mailbox registers 700 shown in FIG. 7, in accordance with example embodiments of the present disclosure. In some embodiments, each entry in a thread mailbox FIFO register 802 may correspond to the mailbox register 700 for a thread of a plurality of threads for execution in a microprocessor. Each mailbox entry in the thread mailbox FIFO register 802 may comprise Next Thread (NT) field 702, Switch Condition (SC) field 704 and Recycle enable (R) field 706, as shown in FIG. 7 and FIG. 8.

A mailbox entry corresponding to one of the threads may be written into a location of the thread mailbox FIFO register 802 based on a write pointer 804. In an embodiment, a mailbox entry 806 being part of the instruction can be written into the thread mailbox FIFO register 802 at a location indicated by the write pointer 804. In another embodiment, a mailbox entry 808 originating from an external source may be written into the thread mailbox FIFO register 802 at a location indicated by the write pointer 804. An external source may be an external memory dedicated for thread switching, an external control processor that configures a next thread based on an interrupt signal of a current thread, etc. In yet another embodiment, a recycled mailbox entry 810 may be pushed back and written into the thread mailbox FIFO register 802 at a location indicated by the write pointer 804. In some embodiments, upon detection of a condition to write a mailbox entry into the thread mailbox FIFO register 802 and writing the mailbox entry as in any of the aforementioned embodiments, the write pointer 804 may be incremented to point to a next mailbox entry location of the thread mailbox FIFO register 802. In an embodiment, FULL condition indicating that the thread mailbox FIFO register 802 is full can be detected when the write pointer 804 is incremented to be the same as a read pointer 812 that points to a mailbox entry to be next read from the thread mailbox FIFO register 802. In this case, another write operation to the thread mailbox FIFO register 802 would cause an exception since a mailbox entry location to which the write pointer 804 points is not empty.

In some embodiments, the read pointer 812 points to a mailbox (thread) entry of the thread mailbox FIFO register 802 that may corresponds to one thread of one or more threads running in a microprocessor. As discussed above, a condition to switch from that current thread to a next thread can be indicated in the SC field 704, and the next thread can be identified in the NT field 702 of the mailbox entry to which the read pointer 812 points. Upon detection of the condition to switch from the current thread to the next thread, the read pointer 812 may be incremented to point to a mailbox entry associated with the next thread. In an embodiment, a mailbox entry corresponding to the thread being switched can be removed from the thread mailbox FIFO register 802, if the R field 706 indicates that thread recycling is not enabled. In another embodiment, the mailbox entry 810 corresponding to the thread being switched can be recycled and pushed back into the thread mailbox FIFO register 802 based on Recycle indication 814 set by an appropriate value of the R field 706, as illustrated in FIG. 8. The recycled mailbox entry 810 may be written into the thread mailbox FIFO register 802 based on a position indicated by the write pointer 804. In some embodiments, EMPTY condition indicating that the thread mailbox FIFO register 802 is empty can be detected when the read pointer 812 is incremented to point to a same mailbox entry location to which the write pointer 804 points. In this case, the thread switch condition is not valid since the thread mailbox FIFO register 802 is empty. A current active thread can only be switched to another thread based on a software instruction, such as SWI.

In some embodiments, when SMT is employed in the microprocessor 200 shown in FIG. 2, an independent set of mailbox registers 700 shown in FIG. 7 may be allocated to each active thread of a plurality of threads that simultaneously run in the microprocessor. Each mailbox register in the set of mailbox registers may be configured with a condition for switching from that active thread to another thread and an identifier of the other thread to which the active thread switches when the condition for thread switching is satisfied. In one or more embodiments, each mailbox register in the set of mailbox registers may comprise the structure of the mailbox register shown in FIG. 7. In some embodiments, the set of mailbox registers allocated to each active thread of the plurality of threads simultaneously running in a microprocessor may be organized as the thread mailbox FIFO register 802 shown in FIG. 8.

Embodiments of the present disclosure support thread switching in multithreading environment. As discussed herein, efficient thread switching may be achieved without software involvement. The thread switching presented in this disclosure may be programmable through internal programming or external control processor. The thread switching presented herein can be flexible through implementation of several different priority schemes.

The thread switching presented in this disclosure is more efficient since it is implemented in hardware rather than in software. For example, a typical software-based thread switching utilizes polling which wastes power consumption. In contrast, a multithread processor with mailbox registers and other AUX registers presented in this disclosure provides an efficient method of thread switching implemented in hardware. The implementation presented herein based on mailbox registers organized in FIFO manner is flexible and can be programmed by internal or external sources. The hardware based method of thread switching presented in this disclosure also reduces software complexity for implementation of multithread microprocessors.

Additional Considerations

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein, a phrase referring to "at least one of" a list of items refers to any combination of those items, including single members. As an example, "at least one of: a, b, or c" is intended to cover: a, b, c, a-b, a-c, b-c, and a-b-c.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method in a microprocessor, comprising:
   allocating a set of mailbox registers to each thread of a plurality of threads for execution in the microprocessor;
   including, in a field of a mailbox register in the set of mailbox registers, an identifier of a next thread of the plurality of threads to be executed in the microprocessor upon thread switching;
   switching execution of the thread to execution of the next thread based upon a thread switch condition indicated in the mailbox register and the identifier of the next thread;
   setting a bit in a first field of a thread enable register to enable a corresponding thread of the plurality of threads in a simultaneous multithreading (SMT) mode, the corresponding thread enabling one or more other threads of the plurality of threads in the SMT mode; and
   enabling or disabling a thread of each of the plurality of threads for coarse grain multithreading, based on a corresponding bit in a second field of the thread enable register.

2. The method of claim 1, further comprising:
   transmitting an interrupt signal to a control processor of the microprocessor to configure the next thread in the field of the mailbox register; and
   writing, by the control processor in response to the interrupt, content associated with the next thread to one or more registers of the microprocessor.

3. The method of claim 1, further comprising:
   pushing the mailbox register of the thread back into a thread mailbox First-In First-Out (FIFO) register allocated to the plurality of threads upon switching from the thread to the next thread,
   the thread mailbox FIFO register having a plurality of mailbox entries, each mailbox entry comprises the mailbox register allocated to one thread of the plurality of threads.

4. The method of claim 1, further comprising:
   writing the thread into a memory of the microprocessor dedicated for thread switching; and
   reading, based on the identifier of the next thread in the mailbox register, the next thread from the memory for execution of the next thread in the microprocessor.

5. The method of claim 1, further comprising:
   configuring execution of one or more threads at a time in the microprocessor by setting at least one bit in a thread configuration register of the microprocessor;
   configuring, in the thread configuration register, a total number of threads for execution in the microprocessor;
   configuring, in the thread configuration register, a number of one or more simultaneous threads for execution in the microprocessor.

6. The method of claim 1, further comprising:
   setting, in a third field of the thread enable register, a priority for thread switching.

7. The method of claim 6, further comprising:
   performing thread switching, based on the priority for the thread switching, using either a round robin process or the identifier of the next thread in the mailbox register.

8. The method of claim 6, further comprising:
   loading the mailbox register with the next thread based on the priority indicated in the thread enable register.

9. The method of claim 1, further comprising:
   writing a program counter (PC) of the thread into a thread PC register associated with the thread, upon switching from the thread to the next thread; and
   fetching instructions of the next thread based on a content of another PC register associated with the next thread, upon switching from the thread to the next thread.

10. The method of claim 9, further comprising:
    modifying the thread PC register and the other thread PC register using an auxiliary interface of the microprocessor.

11. The method of claim 1, further comprising:
    writing processor states of the thread into a thread processor states register associated with the thread, upon switching from the thread to the next thread; and
    restoring processor states of the next thread by reading another thread processor states register associated with the next thread, upon switching from the thread to the next thread.

12. The method of claim 11, further comprising:
    modifying the thread processor states register and the other thread processor states register using an auxiliary interface of the microprocessor.

13. The method of claim 1, wherein the thread switch condition comprises indication about one from a group consisting of:
    thread switching based on Level-2 (L2) cache miss,
    thread switching based on a timer,
    thread switching based on a software interrupt (SWI) generated by the thread,
    thread switching based on an interrupt, and
    thread switching based on an event.

14. The method of claim 1, wherein the allocation of the set of mailbox registers to each thread of the plurality of threads comprises:
    allocating the set of mailbox registers to each thread of the plurality of threads that simultaneously run in the microprocessor, and the method further comprising
    configuring, in each mailbox register in the set of mailbox register, a condition for switching from that thread to another thread and an identifier of the other thread.

15. A microprocessor, comprising:
    a set of mailbox registers allocated to each thread of a plurality of threads for execution in the microprocessor; and one or more auxiliary registers allocated to one or more of the plurality of threads including a thread enable register allocated to the plurality of threads, wherein a mailbox register in the set of mailbox registers allocated to that thread comprises an identifier of a next thread of the plurality of threads to which that thread switches based on a thread switch condition indicated in the mailbox register, the one or more auxiliary registers configure at least one of: a number of threads in the plurality of threads for execution in the microprocessor, a priority for thread switching, storing a program counter (PC) of each thread, or storing states of registers of each thread, a bit in a first field of the thread enable register is set to enable a corresponding thread of the plurality of threads in a simultaneous multithreading (SMT) mode, the corresponding thread enabling one or more other threads of the plurality of threads for execution in the SMT mode, and a thread of each of the plurality of threads is enabled or disabled for coarse grain multithreading, based on a corresponding bit in a second field of the thread enable register.

16. The microprocessor of claim 15, further comprising:
a thread mailbox First-In First-Out (FIFO) register allocated to the plurality of threads having a plurality of mailbox entries, each mailbox entry in the thread mailbox FIFO register comprises the mailbox register allocated to that thread of the plurality of threads.

17. The microprocessor of claim 16, further comprising:
circuitry configured to write a mailbox entry for a thread of the plurality of threads into the thread mailbox FIFO register, based on an instruction of the thread or an external source triggered by the threads.

18. The microprocessor of claim 17, wherein the circuitry is further configured to write the mailbox entry into the thread mailbox FIFO register by recycling the mailbox entry from the thread mailbox FIFO register.

19. The microprocessor of claim 16, further comprising:
circuitry configured to read, from the thread mailbox FIFO register, a mailbox entry comprising the mailbox register for a thread of the plurality of threads, wherein the circuitry is further configured to determine, based on the thread switch condition indicated within the mailbox entry, whether condition for thread switching is satisfied, and the circuitry is further configured to switch execution from the thread to the next thread based on the identifier of the next thread within the mailbox entry, if the condition for thread switching is satisfied.

20. The microprocessor of claim 15, further comprising:
a memory dedicated for thread switching, wherein the memory comprises instructions of the next thread based on the identifier of the next thread.

21. The microprocessor of claim 15, wherein the one or more auxiliary registers comprises:

a thread configuration register, at least one bit in the thread configuration register to configure execution of one or more threads at a time in the microprocessor, a field of the thread configuration register comprising information about the number of threads for execution in the microprocessor; and another field of the thread configuration register comprising information of a number of one or more simultaneous threads for execution in the microprocessor.

22. The microprocessor of claim 15, wherein
a third field of the thread enable register comprising information about the priority for thread switching.

23. The microprocessor of claim 15, wherein the one or more auxiliary registers comprise:

a thread program counter (PC) register allocated for each thread of the plurality of threads, the thread PC register comprises a content of PC of that thread associated with the thread PC register, upon switching from that thread to the next thread, and the thread PC register allocated for the next thread comprises instructions of the next thread.

24. The microprocessor of claim 15, wherein the one or more auxiliary registers comprise:

a thread processor states register to allocate for each thread of the plurality of threads, the thread processor states register loaded with processor states of a current thread upon switching from the current thread to the next thread, and the thread processor states register allocated for the next thread loaded with processor states of the next thread.

25. The microprocessor of claim 15, wherein the priority for thread switching defines thread switching in a round robin manner or thread switching based on the identification of the next thread in the mailbox register.

26. The microprocessor of claim 15, wherein the thread switch condition comprises indication about one from a group consisting of:

thread switching based on an interrupt, thread switching based on Level-2 (L2) cache miss, thread switching based on a timer, and thread switching based on an event.

27. The microprocessor of claim 15, wherein:
the set of mailbox registers are allocated to each thread of the plurality of threads simultaneously running in the microprocessor, and each mailbox register in the set of mailbox registers configures a condition for switching from that thread to another thread and an identifier of the other thread.

* * * * *